INVENTOR
Nils Ingvar Nodfelt
BY [signature]
Attorneys

May 19, 1970     N. I. NODFELT     3,513,436
CONNECTION DEVICE
Filed Dec. 21, 1967     2 Sheets-Sheet 2

United States Patent Office 3,513,436
Patented May 19, 1970

3,513,436
CONNECTION DEVICE
Nils Ingvar Nodfelt, Jarnvagsgatan 76,
Gnosjo, Sweden
Filed Dec. 21, 1967, Ser. No. 692,355
Claims priority, application Sweden, Jan. 25, 1967,
1,066/67
Int. Cl. H01r 7/00, 33/46
U.S. Cl. 339—90       2 Claims

ABSTRACT OF THE DISCLOSURE

A connection device, especially for multiwired electric cables, consists of two mating tubular members adapted to be retained in mating position by means of a locking ring, which is carried by one of the members and is rotatable and to a limited degree also axially displaceable in relation thereto and which when the two members are brought together encloses the front portion of the other member. One of the members is provided with radially directed lugs and the front edge of the juxtaposed member is provided with corresponding shaped gaps into which the lugs fit in one definite relative position only. The lugs of the member are designed for cooperation with lugs at the ring for locking the members together.

BACKGROUND OF THE INVENTION

Previous designs of connecting devices having fixed mating positions for several electric wires contain locking parts, which make possible a fitting together of the parts in one position only. These locking parts are usually made of di-electric material and are designed as separate elements. The material in these locking parts is easily damaged due to the stresses imposed upon the connecting members by the locking ring. In one known embodiment the connection is brought about by a bayonet clutch, which consists of external helical grooves at one of the connection members, which extend to the front edge of the member and cooperate with internal lugs at the coupling ring, carried by the other connection member. By a turning of the ring in relation to the first member the two members are forced together in the axial direction. In order better to resist wear the interlocking parts of the clutch are usually made of steel. Especially in the aircraft industry it is, however, desired that the members should be designed in a non-magnetic material, such as aluminium.

SUMMARY OF THE INVENTION

The object of the present invention is to provide a connection device, which fulfills above mentioned desideration, i.e. the fixed angular position connection between the members, and the inter-locking by a bayonet clutch by parts formed in the members. Hereby a simple and safe connecting device is obtained, which may also be given very small external measures compared to the capacity of connection points.

The invention is essentially characterised by a number of radially directed angularly spaced connection lugs at the front end of the second connection member, each of said lugs having an axially directed locking portion, and a number of teeth and gaps at the front end of the first connection member, the breadth of a tooth essentially corresponding to the gap between the axially directed locking portions of the lugs at the second member, and in the locking ring on its inside near the end turned towards the second member being provided with lugs adapted for cooperation with the lugs at the second connection member.

DESCRIPTION OF A PREFERRED EMBODIMENT

Figure 1:
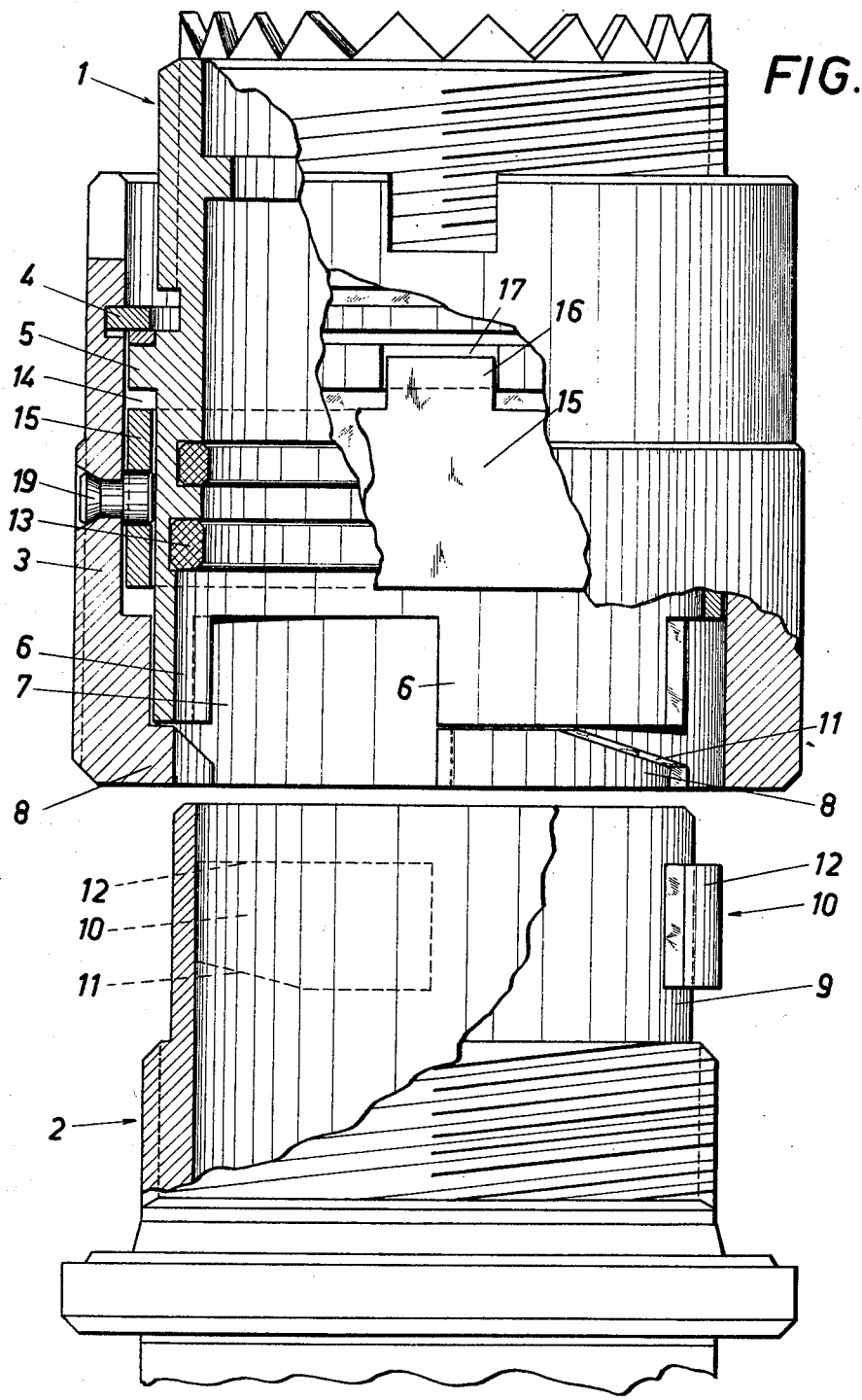
FIG. 1 shows an elevation, partly in section, of a connection device.
Figure 2:
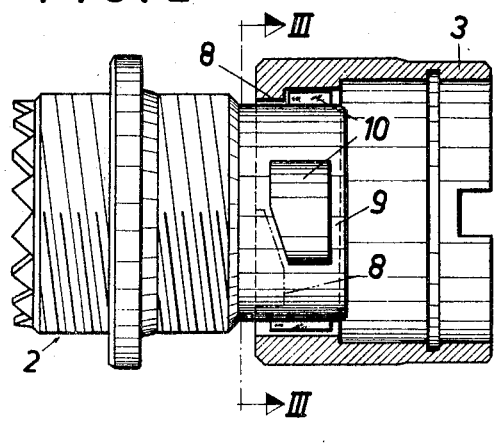
FIG. 2 shows an elevation of one connection member with the locking ring, but removed from the other member.
Figure 3:
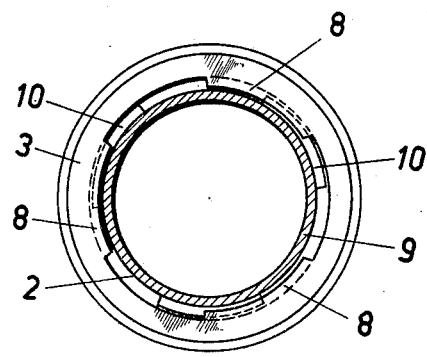
FIG. 3 shows a section along line III—III in FIG. 2.
Figure 4:
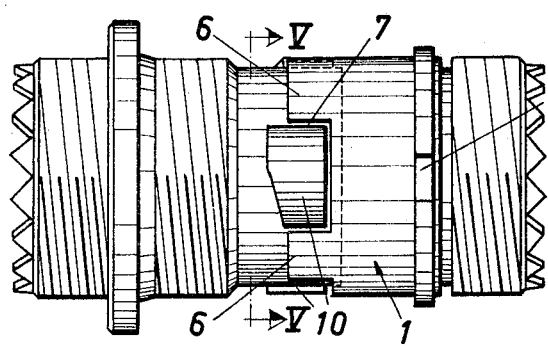
FIG. 4 shows an elevation of the two members joined, but with the locking ring removed.
Figure 5:
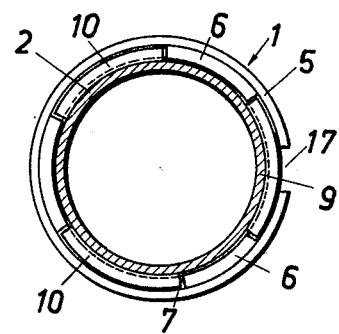
FIG. 5 shows a section along line V—V in FIG. 4.
Figure 6:
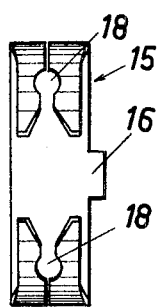
FIG. 6 shows an elevation of an annular spring and
FIG. 7 shows the spring as viewed from above.
Figure 7:
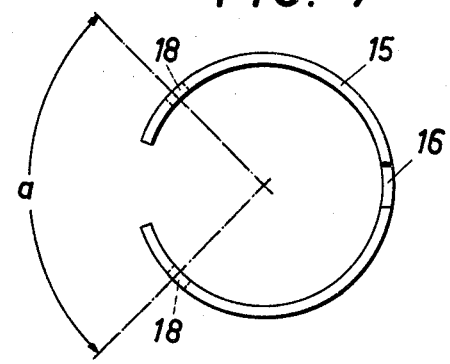

The connection device according to the invention consists of two tubular members 1 and 2, of which the first member 1 carries a locking ring 3. This encloses an essential part of the member 1, and is so arranged that it in cooperation with a resilient ring 4 may be turned, and to a limited degree also axially displaced in relation thereto. In one axial position of the locking ring 3 the ring 4 will be brought to abut against external flanges 5 at the member 1. The part of member 1, which is adapted to cooperate with the second member, is provided with a number of axially directed teeth separated by gaps 7. The locking ring 3 is provided with a number of internal connection lugs 8, which are arranged at the front edge thereof.

The second tubular connection member 2 has a cylindrical front portion 9, with slightly less external diameter than the free measure between the lugs 8 at the locking ring 3 and the internal diameter of member 1. The cylindrical front portion 9 is provided with a number of external lugs 10 corresponding to the lugs 8 at the locking ring 3. The pitch of the lugs is such that the lugs will fit into the gaps between the teeth in the first member in one definite position only. The cooperating edges of the lugs 8 and 10 are provided with an axial guiding portion and an oblique peripheral wedging portion 11, which extend over at least one half of the peripheral length of the lug. The lugs 10 of the second connection member 2 are furthermore designed with an axial elongated portion 12, which when the members 1 and 2 are brought into mating position fit into the gaps 7 and thereby make possible an axial movement of the members in relation to each other, but prevent relation turning of the members. The front edge of the elongated portions 12 is arranged at some distance from the front edge of the cylindrical portions 9, which is adapted to fit into the first member and to cooperate with a resilient packing 13 arranged therein. The lugs 8 and 10 are preferably made integral with the ring and the members, respectively, which part whenever desired may be made of aluminium.

The turning movement of the locking ring 3 is limited by means of a spring 15, which is designed as a split ring, and is mounted in a recess 14 formed between the envelop surface of member 1 and the locking ring 3. The meeting edges of the spring are separated by a short distance, and diametrically opposite the opening in the ring the spring is provided with a lug 16 arranged in the axial direction of the coupling device. This lug is designed to fit into a groove 17 in the flange 5 at the first connection member 1. The end portions of the spring 15 are each provided with a notch 18, tapering inwards towards a restricted opening. The angular distance *a* between these openings is so chosen that a peg 19 attached to the locking ring 3 may move within an angle of about 90°. In one end position of the ring 3, i.e. when the peg 19 has entered one of the openings 18 in the spring, the lugs 8 of the locking ring are exactly aligned in relation to the teeth 6 of member 1, the teeth having essentially the same pitching as the lugs at the locking ring.

What I claim is:

1. A connection device, especially for the connection of multi-wired electric cables, comprising two tubular members adapted to fit one into the other and provided with axially directed interlocking parts and a locking ring carried by a first of said members, said ring being rotatable and to a limited degree also axially displaceable in relation to said first member, and which, when the two members are brought together, encloses the front end of the second connecting member the improvement comprising a number of radially directed, angularly spaced, first connecting lugs at the front portion of the second connecting member, each of said lugs having an axially directed guiding portion, an oblique peripheral wedging portion extending at least over one half of the peripheral length of the lug, and an adjoining locking portion perpendicular to the longitudinal axis of the member, a number of teeth and gaps at the front edge of the first member, the breadth of a tooth essentially corresponding to the gap between the axially directed guiding portions of two adjacent lugs at the second member, a number of second connecting lugs at the end of the ring turned towards the second member, said second lugs being positioned in the same manner as the first lugs and each having an oblique peripheral wedging portion and an adjoining locking portion for cooperation with the corresponding portions of the first lugs, a split spring ring having juxtaposed ends mounted in a recess between the first connecting member and the locking ring carried thereby, said spring ring being angularly locked in relation to the first member by means of an axially directed lug at the spring ring mating with a recess in the member, and a radially inwards directed peg at the locking ring being movable in the gap between the juxtaposed ends of the split spring ring.

2. The connection device according to claim 1, in which the spring ring has edges and each edge is provided with a notch tapering inwards towards a restricted central opening adapted to receive the peg, the angular distance between the opening being so chosen, that the second lugs at the locking ring are exactly aligned with the teeth of the first member, when the peg has entered one of said openings.

References Cited

UNITED STATES PATENTS

| 1,761,352 | 6/1930 | Logan | 285—362 |
| 343,089 | 6/1886 | Symes et al. | 285—362 |
| 2,409,650 | 10/1946 | Wiggins | 285—173 |

FOREIGN PATENTS

| 2,131 | 5/1931 | Australia. |
| 1,123,891 | 6/1956 | France. |
| 4,272 | 1/1908 | Great Britain. |

RICHARD E. MOORE, Primary Examiner

J. H. McGLYNN, Assistant Examiner